(12) United States Patent
Auvray et al.

(10) Patent No.: US 10,919,806 B2
(45) Date of Patent: Feb. 16, 2021

(54) DEVICE COMPRISING A CABLE OR CABLE ACCESSORY CONTAINING A FIRE-RESISTANT COMPOSITE LAYER

(71) Applicant: NEXANS, Courbevoie (FR)

(72) Inventors: Thierry Auvray, Lyons (FR); Franck Gyppaz, Lyons (FR); Anne-Gaëlle Alexandre, Craponne (FR)

(73) Assignee: NEXANS, Courbevoie (FR)

( * ) Notice: Subject to any disclaimer, the term of this patent is extended or adjusted under 35 U.S.C. 154(b) by 162 days.

(21) Appl. No.: 16/090,735

(22) PCT Filed: Apr. 6, 2017

(86) PCT No.: PCT/FR2017/050821
§ 371 (c)(1),
(2) Date: Oct. 2, 2018

(87) PCT Pub. No.: WO2017/174941
PCT Pub. Date: Oct. 12, 2017

(65) Prior Publication Data
US 2019/0112230 A1    Apr. 18, 2019

(30) Foreign Application Priority Data
Apr. 7, 2016 (FR) ...................... 1653074

(51) Int. Cl.
*H01B 7/295* (2006.01)
*C04B 28/00* (2006.01)
*C04B 111/00* (2006.01)

(52) U.S. Cl.
CPC .......... *C04B 28/006* (2013.01); *H01B 7/295* (2013.01); *C04B 2111/00482* (2013.01); *C04B 2111/00844* (2013.01); *Y02P 40/10* (2015.11)

(58) Field of Classification Search
CPC combination set(s) only.
See application file for complete search history.

(56) References Cited

U.S. PATENT DOCUMENTS

2016/0244366 A1    8/2016 Turcinskas et al.
2017/0250001 A1*   8/2017 Wu .................. C08K 3/013

FOREIGN PATENT DOCUMENTS

| CN | 101544484 | 9/2009 |
| CN | 105400131 | 3/2016 |
| JP | H0680461  | 3/1994 |
| JP | H0680461 A | * 3/1994 ............ C04B 28/26 |

OTHER PUBLICATIONS

Machine translation of CN105400131 (Year: 2016).*
Machine translation of JP H06080461 A (Year: 1994).*
(Continued)

*Primary Examiner* — Ramsey Zacharia
(74) *Attorney, Agent, or Firm* — Sofer & Haroun, LLP

(57) ABSTRACT

The present invention relates to a device comprising a cable and/or a cable accessory, said cable and/or said cable accessory comprising at least one composite layer obtained from a composite composition based on at least one aluminosilicate geopolymer composition and on at least one low-viscosity organic polymer or oligomer, and also to the process for preparing same.

19 Claims, 1 Drawing Sheet

(56) References Cited

OTHER PUBLICATIONS

Database WPI, Thomson Scientific, London, GB; AN 2016-18467C, XP002763968, & CN 105 400 131 A (TANG S) Mar. 16, 2016.
Database WPI Week 200972 Thomson Scientific, London, GB; AN 2009-P78262 XP002763969, & CN 101 544 484 A (Univ Xian Architecture & Technology) Sep. 30, 2009.
International Search Report dated Jun. 22, 2017.
Notification of Provisional Refusal dated Mar. 23, 2020.

* cited by examiner

DEVICE COMPRISING A CABLE OR CABLE ACCESSORY CONTAINING A FIRE-RESISTANT COMPOSITE LAYER

RELATED APPLICATION

This application is a National Phase of PCT/FR2017/050821, filed on Apr. 6, 2017, which claims the benefit of priority from French Patent Application No. 16 53074, filed on Apr. 7, 2016, the entirety of which are incorporated by reference.

BACKGROUND

Field of the Invention

The present invention relates to a device comprising a cable and/or a cable accessory, said cable and/or said cable accessory comprising at least one composite layer obtained from a composite composition based on at least one aluminosilicate geopolymer and on at least one low-viscosity organic polymer or oligomer, and also to a process for manufacturing such a device.

It applies typically, but not exclusively, to electric and/or optical cables, intended for the transmission of power and/or the transmission of data, in particular to fire-resistant electric and/or optical safety cables, especially halogen-free, able to function for a given period of time in fire conditions, without propagating the fire or generating large amounts of smoke; and also to their accessories such as joints and/or terminations. These safety cables are in particular medium-voltage power transmission cables (especially from 6 to 45-60 kV) or low-frequency transmission cables, such as control or signaling cables.

Description of Related Art

A power and/or telecommunications cable is a cable intended for the transmission of electrical energy and/or for data transmission. It conventionally comprises one or more insulated conductive elements, or in other words one or more elongated (electrical and/or optical) conductor(s) surrounded by at least one electrically insulating layer. The electrically insulating layer may typically be an electrically insulating polymer layer in physical contact with the electrical and/or optical conductor(s). Said insulated conductive element(s) are surrounded by an outer protective sheath intended to provide mechanical protection of the insulated conductive element(s). In certain cable designs, there is only a single layer that provides the two functions of electrical insulation and protective sheath.

The materials generally used to form the electrically insulating layer and/or said protective sheath are composite materials based on polymers, for example silicone polymers, and various additives, in particular reinforcing fillers such as silica, and fireproofing (or flame-retardant) fillers intended to improve their fire resistance.

Despite the presence of such fillers, the fire resistance of these insulating layers is not always entirely satisfactory.

In order to make one or more cables fire-resistant, it has also been proposed, especially in patent application EP-A1-2 760 030, to cover said cables with an electrically insulating layer comprising several superposed insulating tapes comprising mica and glass fibers, and a polymer binder (e.g. polyorganosiloxane) in contact with each of said insulating tapes. However, the cost of producing said electrically insulating layer is high (i.e. very long preparation time), and said layer is very bulky.

Other materials such as stone, brick, cement, lead, steel, concrete, rock wool, ceramics, geopolymers, etc., have fire resistance properties.

In particular, geopolymers are essentially mineral chemical compounds or mixtures of compounds consisting of units of the silico-oxide (—Si—O—Si—O—), silico-aluminate (—Si—O—Al—O—), ferro-silico-aluminate (—Fe—O—Si—O—Al—O—), or alumino-phosphate (—Al—O—P—O—) type, created by a process of geopolymerization (i.e. polycondensation). The geopolymers may be used alone or as a mixture with organic polymers, mineral fibers, metal fibers, or organic fibers (e.g. glass fibers, ceramic fibers, etc.), carbon fibers, graphite fibers, etc., depending on the type of application required. Geopolymers are generally capable of polymerizing and curing at room temperature (geopolymer cements). It is also possible to accelerate the rate of polymerization and therefore the curing of the geopolymers by subjecting them to a heat treatment. The exact geopolymerization mechanism still remains unknown due in particular to the rapidity of the reaction.

The most common geopolymers are those based on aluminosilicates denoted by the term "poly(sialate)" [or "poly (silico-oxo-aluminate)" or (—Si—O—Al—O—)$_n$ with n denoting the degree of polymerization]. These aluminosilicate geopolymers result from the polycondensation of oligomers of the oligo(sialate) type generally formed from a mixture of at least one aluminosilicate, of an alkali metal reactant (e.g. sodium or potassium silicate) and of water. Aluminosilicate-based geopolymers have been grouped into three families as a function of the Si/Al atomic ratio, which may be equal to 1, 2 or 3. A distinction is made between the poly(sialates) corresponding to the formula $M_n$(—Si—O—Al—O—)$_n$ or (M)-PS, the poly(sialate-siloxos) corresponding to the formula $M_n$(—Si—O—Al—O—Si—O—)$_n$ or (M)-PPS, and the poly(sialate-disiloxos) corresponding to the formula $M_n$(—Si—O—Al—O—Si—O—Si—O)$_n$ or (M)-PSDS, with M representing at least one alkali or alkaline-earth metal cation such as K, Na, Li, Cs or Ca and n denoting the degree of polymerization.

Geopolymers are used in many applications: design of novel materials in the fields of civil engineering and construction, creation of sculptures, manufacture of partitions and fire doors for protection against fires, manufacture of coatings of a substrate, mortar, adhesive or molding material, manufacture of flexible fire-resistant boards used for protection against fire for openings in walls, and also for passages for cables, and quite recently as the structure of the "black box" on board aircraft.

However, the solutions described in the prior art are not suitable, especially in terms of flexibility, adhesion and heat protection, to be able to serve as a fire-resistant layer in an electric and/or data transmission cable and/or in a cable accessory, especially during a fire. Moreover, they are not necessarily compatible with retaining good mechanical and dielectric properties of the other constituents of a cable accessory or of a cable (electric and/or optical conductive element, other layers, especially electrically insulating layers, screens, etc.).

OBJECTS AND SUMMARY

The aim of the present invention is to overcome the drawbacks of the techniques of the prior art by proposing a cable or a cable accessory comprising at least one layer having good fire resistance, while guaranteeing good mechanical properties, especially in terms of flexibility, and an advantageous cost price.

Another aim of the invention is to provide a process that is simple, economical, easy to carry out and that makes it possible to achieve a cable or a cable accessory comprising at least one layer which prevents flame propagation, resists fire in order to operate for as long as possible, and limits degradation thereof in extreme heat conditions such as a fire, while guaranteeing good mechanical properties, especially in terms of flexibility.

The first subject of the present invention is a device comprising a power and/or telecommunications cable and/or a power and/or telecommunications cable accessory, characterized in that said cable and/or said cable accessory comprises at least one composite layer obtained from a composite composition comprising at least one organic polymer or oligomer that is liquid at ambient temperature and at least one aluminosilicate geopolymer in the form of a gel, said aluminosilicate geopolymer in the form of a gel being obtained from an aluminosilicate geopolymer composition comprising an alkali metal aluminate or an aluminosilicate, an alkali metal silicate, water and optionally an alkali metal base.

The aluminosilicate geopolymer in the form of a gel preferably comprises water, silicon (Si), aluminum (Al), oxygen (O), and at least one element selected from potassium (K), sodium (Na), lithium (Li), cesium (Cs) and calcium (Ca), and preferably selected from potassium (K) and sodium (Na).

When an alkali metal aluminate is used, the silicon of the aluminosilicate geopolymer originates from the alkali metal silicate of the aluminosilicate geopolymer composition and the aluminum of the aluminosilicate geopolymer originates from the alkali metal aluminate of the aluminosilicate geopolymer composition. In other words, the alkali metal aluminate is not a source of silicon for forming the aluminosilicate geopolymer and the alkali metal silicate is not a source of aluminum for forming the aluminosilicate geopolymer.

When an aluminosilicate is used instead of an alkali metal aluminate, the silicon of the aluminosilicate geopolymer originates from the alkali metal silicate and from the aluminosilicate of the aluminosilicate geopolymer composition, and the aluminum of the aluminosilicate geopolymer originates from the aluminosilicate of the aluminosilicate geopolymer composition.

In present invention, the expression "ambient temperature" means a temperature ranging from 18° C. to 25° C. approximately.

In the present invention, the aluminosilicate geopolymer composition is capable of forming an aluminosilicate geopolymer. The ingredients of the aluminosilicate geopolymer composition may therefore undergo a polycondensation in order to form an aluminosilicate geopolymer. Indeed, geopolymers result from a mineral polycondensation reaction by alkaline activation, referred to as geosynthesis, as opposed to traditional hydraulic binders in which the curing is the result of a hydration of the calcium aluminates and calcium silicates.

Consequently, the aluminosilicate geopolymer composition of the invention is different from a ceramic composition or powder or from a composition comprising a conventional anhydrous cement (e.g. cements classified according to the standard EN-197-1-2000, for example Portland cement such as white cement or slag and ash cement) and water.

Furthermore, unlike aluminosilicate geopolymer compositions from the prior art, the aluminosilicate geopolymer composition of the invention has the advantage of being able to result, in the course of the polycondensation, in an aluminosilicate geopolymer in the form of a gel.

The aluminosilicate geopolymer is not therefore in the form of a powder or of solid particles at the end of the geopolymerization. This is because that may make the mixing of the aluminosilicate geopolymer with the organic oligomer or polymer difficult.

The gel state of the geopolymer makes it possible to improve the mixing of the aluminosilicate geopolymer with the organic oligomer or polymer, and thus to obtain a homogeneous composite composition.

The aluminosilicate geopolymer in the form of a gel is preferably obtained from an aluminosilicate geopolymer composition comprising an alkali metal aluminate, an alkali metal silicate, water and optionally an alkali metal base.

Specifically, when the alkali metal aluminate is used, the gel obtained is uniform or homogeneous, i.e. with no formation of micrometric grains during the geopolymerization. In other words, the composite composition does not comprise the precursors of silicon and aluminum used in the aluminosilicate geopolymer composition (i.e. the alkali metal silicate and the alkali metal aluminate). Indeed, said precursors have reacted during the geopolymerization to form a homogeneous gel.

The alkali metal silicate may be selected from sodium silicates, potassium silicates and a mixture thereof. The alkali metal silicates sold by the company Silmaco and by the company PQ Corporation are preferred.

The alkali metal aluminate may be a potassium or sodium aluminate.

According to one embodiment of the invention, the aluminate is a sodium aluminate.

The aluminosilicate may be selected from kaolins such as metakaolin (i.e. calcined kaolin), fly ash, blast furnace slag, swelling clays such as bentonite, calcined clays, any type of compound comprising aluminum and pyrogenic silica, zeolites and a mixture thereof.

The aforementioned aluminosilicates may induce the formation of a heterogeneous gel, i.e. a gel comprising micrometric grains comprising residues of aluminosilicates that have not completely reacted during the geopolymerization.

Use will preferably be made of the metakaolin sold by the company Imérys since it makes it possible to reduce the proportion of micrometric grains within the gel.

When it is present, the alkali metal base may be selected from KOH, NaOH and mixtures thereof.

According to one particularly preferred embodiment of the invention, the aluminosilicate geopolymer composition comprises from 0.5% to 20% by weight approximately of an alkali metal aluminate, from 15% to 50% by weight approximately of an alkali metal silicate, from 0 to 3% by weight approximately of an alkali metal base and from 50% to 90% by weight approximately of water.

According to one particularly preferred embodiment of the invention, the aluminosilicate geopolymer composition comprises from 0.5% to 20% by weight approximately of an aluminosilicate, from 15% to 40% by weight approximately of an alkali metal silicate, from 0 to 3% by weight approximately of an alkali metal base and from 40% to 80% by weight approximately of water.

According to one particularly preferred embodiment of the invention, the aluminosilicate geopolymer composition comprises from 0.5% to 15% by weight approximately of an alkali metal aluminate, from 15% to 40% by weight approximately of an alkali metal silicate, from 0 to 3% by weight approximately of an alkali metal base and from 55% to 85% by weight approximately of water.

According to one particularly preferred embodiment of the invention, the aluminosilicate geopolymer composition comprises from 0.5% to 15% by weight approximately of an aluminosilicate, from 15% to 40% by weight approximately of an alkali metal silicate, from 0 to 3% by weight approximately of an alkali metal base and from 50% to 70% by weight approximately of water.

In particular, the aluminosilicate geopolymer composition comprises from 15% to 50% by weight approximately of solids (alkali metal aluminate or aluminosilicate, alkali metal silicate and alkali metal base when it is present), and preferably from 15% to 40% by weight approximately, relative to the total weight of said composition.

The aluminosilicate geopolymer is in the form of a gel at ambient temperature.

Furthermore, the use of an alkali metal aluminate instead of an aluminosilicate generally used in the geopolymer compositions of the prior art is preferred. Specifically, it makes it possible to substantially reduce the formation and the presence of micrometric grains within said geopolymers.

The composite composition further comprises an organic polymer or oligomer that is liquid at ambient temperature.

The organic polymer or oligomer is not therefore in solid form or in the form of a dispersion of solid particles in an aqueous phase such as a latex or of an organic phase. This is because that may make the mixing of the organic oligomer or polymer with the aluminosilicate geopolymer difficult.

Its liquid state makes it possible to improve the mixing of the organic oligomer or polymer with the aluminosilicate geopolymer, and thus to obtain a homogeneous composite composition.

Said organic polymer that is liquid at ambient temperature may have a molecular weight of at least 10 000 g/mol approximately.

Said organic oligomer that is liquid at ambient temperature may have a molecular weight of at least 1000 g/mol approximately, and preferably of at least 2000 g/mol approximately.

The organic oligomer or polymer that is liquid at ambient temperature may be selected from polyorganosiloxanes, polyethylenes, ethylene/vinyl acetate copolymers, polyethylene glycols, epoxide resins and acrylic resins.

Polyorganosiloxanes and polyethylene glycols are preferred.

Polyorganosiloxanes, and in particular silicone oils, may have a viscosity ranging from 5000 cP (or 6000 cP) to 50 000 cP at 25° C. approximately.

The composite composition may further comprise a crosslinking agent.

The crosslinking agent may be selected from peroxides, in particular organic peroxides.

When it is used, the crosslinking agent preferably represents from 0.2% to 5% by weight approximately, and preferably from 0.2% to 3% by weight approximately, relative to the total weight of the composite composition.

The composite composition may further comprise at least one cellulose compound, in particular in a proportion of from 0.01% to 20% by weight approximately, and more preferably from 0.1% to 10% by weight approximately, relative to the total weight of the composite composition.

The composite composition may further comprise at least one starch.

The starch generally comprises amylose, amylopectin, and optionally phytoglycogen.

By way of example (and depending on the source), the starch comprises from 15 to 30% by weight of amylose, from 70 to 85% by weight approximately of amylopectin, and from 0 to 20% by weight of phytoglycogen, relative to the total weight of the starch.

The starch may be a native starch or a modified starch, and preferably a native starch.

The native starch may be a starch from cereals (e.g. wheat, corn, barley, triticale, sorghum or rice), tubers (e.g. potato or cassava), legumes (e.g. pea or soybean), roots, bulbs, stems, fruit or a mixture thereof.

The modified starch may be a starch modified physically, chemically or enzymatically.

The modified starch may be selected from oxidized starches, starches hydrolyzed by acid, oxidizer or enzymatically, starches modified (e.g. functionalized) physico-chemically, such as especially esterified and/or etherified starches.

The functionalization may be obtained by acetylation in aqueous phase with acetic anhydride, reactive extrusion of acid anhydrides, mixed anhydrides, fatty acid chlorides, caprolactone or lactide oligomers, hydroxypropylation in a tacky phase, cationization in a dry phase or tacky phase, by crosslinking, by anionization by phosphation or succinylation, by silylation, by telomerization with butadiene, etc.

Oxidized starches are preferred.

According to the invention, the starch preferably represents from 0.01% to 20% by weight approximately, and more preferably from 0.1 to 10% by weight approximately, relative to the total weight of said composite composition.

The composite composition may further comprise at least one plasticizer.

The plasticizer may be intended to improve the dispersion of the starch within the composite layer or be used as a processing aid.

The plasticizer may be a metal stearate, an ethylene glycol, a polyol such as glycerol, sorbitol, mannitol, maltitol, xylitol, a sucrose such as glucose or fructose, a plasticizer containing amide groups, any type of plasticizer based on modified polysaccharide(s) or a mixture thereof.

The preferred plasticizer is a metal stearate such as zinc stearate.

According to the invention, the plasticizer preferably represents from 0.01% to 20% by weight approximately, and more preferably from 0.1% to 10% by weight approximately, relative to the total weight of said composite composition.

The composite composition may further comprise at least one inert filler, in particular selected from talc, phyllosilicates, hydroxide hydrates such as aluminum hydroxide (ATH) or magnesium hydroxide (MDH), silicas, borates, micas and kaolins.

Talc is preferred.

When it is used, the inert filler preferably represents from 0.01% to 18% by weight approximately, and more preferably from 0.1% to 10% by weight approximately, relative to the total weight of the composite composition.

The composite composition may further comprise at least one colorant, in particular selected from colorants that are liquid at ambient temperature.

When it is used, the colorant preferably represents from 0.5% to 1.5% by weight approximately, relative to the total weight of the composite composition.

According to the invention, the aluminosilicate geopolymer preferably represents from 20% to 90% by weight approximately, and even more preferentially from 50% to 85% by weight approximately, relative to the total weight of the composite composition.

According to the invention, the organic polymer or oligomer preferably represents from 10% to 80% by weight approximately, and even more preferentially from 15% to 50% by weight approximately, relative to the total weight of the composite composition.

The composite layer is preferably fire resistant.

The organic polymer that is liquid at ambient temperature of the composite composition makes it possible to ensure the cohesion of the composite layer and the adhesion thereof to the layer of the cable with which it is intended to be in direct physical contact. The aluminosilicate geopolymer of the composite composition itself ensures the fire resistance of the composite layer.

In other words, the composite layer of the device of the invention is a homogeneous organic/inorganic hybrid layer. In particular, this homogeneity is obtained owing to the combination within the composite composition of an aluminosilicate geopolymer which is in the form of a gel and of an organic polymer in liquid form at ambient temperature. The composite layer obtained is flexible.

Advantageously, the device in accordance with the invention complies with at least any one of the following fire resistance standards: EN50200, IEC60331-1, EN50399, IEC60331-11, IEC60331-21, IEC60331-23, IEC60331-25, DIN4102, NBN713020 addendum 3, EN50577, NFC32070 CR1, IEC600332-1 and BS6387CWZ.

Advantageously, the composite layer defined above complies with the fire resistance standard IEC 60331-11, with electric cables at a voltage of 10 kV exposed to a temperature of 750° C. approximately for 120 minutes.

The composite layer preferably has a substantially constant thickness and forms in particular a continuous protective envelope.

The composite layer preferably has a thickness ranging from 0.5 to 4 mm approximately, and more preferably ranging from 1.5 to 3 mm approximately.

When the thickness of the composite layer is less than 0.5 mm, the thermal protection of the device of the invention is not sufficient.

The composite layer preferably comprises an aluminosilicate geopolymer having an Si/Al molar ratio ranging from 1 to 35, and preferably ranging from 1.9 to 3.

The aluminosilicate geopolymer of the composite layer may be selected from poly(sialates) corresponding to the formula (I) $M_n(—Si—O—Al—O—)_n$ [(M)-PS], poly(sialate-siloxos) corresponding to the formula (II) $M_n(—Si—O—Al—O—Si—O—)_n$ [(M)-PPS], and poly(sialate-disiloxos) corresponding to the formula (III) $M_n(—Si—O—Al—O—Si—O—Si—O)_n$ [(M)-PSDS], in which formulae M represents at least one K, Na, Li or Cs alkali metal cation or a mixture thereof and n denoting the degree of polymerization. In the compound of formula (I), the Si/Al molar ratio is 1, in the compound of formula (II), the Si/Al molar ratio is 2, and in the compound of formula (III), the Si/Al molar ratio is 3.

The composite layer of the invention is preferably non-porous.

The composite layer of the invention is preferably an extruded layer, in particular that is extruded by processes well known to a person skilled in the art.

The composite layer of the invention is preferably an electrically insulating layer.

In the present invention, an "electrically insulating layer" is understood to mean a layer of which the electrical conductivity may be at most $1\times10^{-9}$ S/m, and preferably at most $1\times10^{-10}$ S/m (siemens per meter) (at 25° C.).

Owing to the presence of the composite layer, the device in accordance with the invention has an excellent fire resistance while having good mechanical properties. In particular, the composite layer is sufficiently flexible to enable manipulation of the cable (e.g. winding, bending, twisting) without leading to any unacceptable deterioration of said layer which would have the consequence of reducing the cohesion and fire resistance thereof. Moreover, the composite layer remains intact from ambient temperature to the operating temperature of the cable under load (i.e. under voltage) and has the advantage of forming an ordered porous structure starting from 450° C., thus making it possible to provide increased protection against the diffusion of heat at temperatures greater than or equal to 1000° C. for a duration which may extend up to 120 min, reached especially during a fire. This porous and rigid structure contains air which, by its nature, is an excellent thermal insulator.

In other words, the composite layer is converted under the effect of a high temperature, in particular a temperature ranging from 450° C. to 1000° C., generally reached during a fire, in order to form a cohesive and porous residual layer that protects the cable or the cable accessory, and in particular the underlying layers and/or the elongated conductive element.

According to a first variant of the invention, the device comprises a power and/or telecommunications cable.

A power and/or telecommunications cable generally comprises at least one elongated conductive element and at least one outer protective, in particular electrically insulating, sheath.

According to a second variant of the invention, the device comprises a power and/or telecommunications cable accessory.

A cable accessory may be a joint or a termination that may comprise an assembly of several layers of materials (e.g. polymer materials) generally of silicone rubber type, one or more reinforcing layers, for example one or more metal layers, and also an outer protective (e.g. fire-resistant) sheath such as for example an elastomer tape or a mica strip.

The composite layer is preferably an inner layer of said cable or of said cable accessory.

According to the invention, an "inner layer" is understood to mean a layer that does not form the outermost layer of the cable or of the cable accessory, and more particularly:
- in the case of a cable, a layer interposed between the elongated conductive element and an outer protective, in particular electrically insulating, sheath, said layer optionally being in direct contact with the elongated conductive element, and
- in the case of a joint or a termination, a layer interposed between the outer protective sheath and one of the layers of silicone rubber type material and/or one of the reinforcing layers, said layer optionally being in direct contact with said outer sheath.

The composite layer of the cable of the invention generally covers one or more elongated conductive elements or is positioned on an inner layer or sheath of the cable or of the cable accessory; it then acts as filler.

According to one preferred embodiment, the device is a cable.

In this case, the cable comprises at least one elongated conductive element and the composite layer as defined in the invention surrounds said elongated conductive element.

The composite layer is preferably in direct physical contact with the elongated conductive element.

The cable may comprise a plurality of elongated conductive elements.

The composite layer may then surround the plurality of elongated conductive elements of the cable.

The composite layer of the invention is preferably in direct physical contact with the elongated conductive elements.

The cable may comprise a plurality of composite layers as defined in the invention.

According to a first variant of this embodiment, the cable comprises one or more elongated conductive elements and the plurality of composite layers surrounds the elongated conductive element or the plurality of elongated conductive elements.

By way of example, the cable may comprise two composite layers as defined in the invention which are adjacent.

According to a second variant of this embodiment, the cable comprises a plurality of elongated conductive elements and each of the composite layers individually surrounds each of the elongated conductive elements in order to form isolated elongated conductive elements.

According to this second variant, each of the composite layers of the invention is preferably in direct physical contact with each of the elongated conductive elements that it surrounds.

The elongated conductive element(s) of the cable of the invention are preferably elongated electrically conductive elements. The cable is consequently an electric cable.

The cable of the invention may further comprise an outer protective, in particular electrically insulating, sheath surrounding the composite layer(s).

The outer protective sheath is preferably produced from a halogen-free material. It may be produced conventionally from materials that retard flame propagation or that withstand flame propagation. In particular, if these materials do not contain halogen, reference is made to HFFR (Halogen Free Flame Retardant) sheathing.

The sheath represents the outermost layer of the cable (i.e. also referred to as exterior protective sheath).

It comprises at least one organic or inorganic polymer.

The choice of organic or inorganic polymer is nonlimiting, and these are well known to those skilled in the art.

According to a preferred embodiment of the invention, the organic or inorganic polymer is selected from crosslinked and non-crosslinked polymers.

The organic or inorganic polymer may be a homopolymer or a copolymer having thermoplastic and/or elastomeric properties.

The inorganic polymers may be polyorganosiloxanes.

The organic polymers may be polyurethanes or polyolefins.

The polyolefins may be selected from ethylene and propylene polymers. By way of example of ethylene polymers, mention may be made of linear low-density polyethylene (LLDPE), low-density polyethylene (LDPE), medium-density polyethylene (MDPE), high-density polyethylene (HDPE), ethylene-vinyl acetate copolymers (EVA), ethylene-butyl acrylate copolymers (EBA), ethylene-methyl acrylate copolymers (EMA), ethylene-2-ethylhexyl acrylate copolymers (2HEA), copolymers of ethylene and of alpha-olefins such as, for example, polyethylene-octenes (PEO), ethylene-propylene copolymers (EPR), ethylene-propylene terpolymers (EPT) such as, for example, ethylene-propylene diene monomer terpolymers (EPDM) or a mixture thereof.

The polymer of the sheath is preferably an organic polymer, more preferably an ethylene polymer, and more preferably an ethylene-vinyl acetate copolymer, a linear low-density polyethylene or a mixture thereof.

The outer protective sheath may further comprise a hydrated flame-retardant mineral filler. This hydrated flame-retardant mineral filler acts mainly by the physical route by decomposing endothermically (e.g., release of water), which has the consequence of lowering the temperature of the sheath and of limiting the propagation of flames along the cable. Reference is made especially to flame retardant properties.

The hydrated flame-retardant mineral filler may be a metal hydroxide such as magnesium hydroxide or aluminum trihydroxide.

The outer protective sheath may also further comprise an inert filler, in particular selected from talc, micas, dehydrated clays and a mixture thereof.

A second object of the invention is a process for manufacturing a device comprising a power and/or telecommunications cable and/or a power and/or telecommunications cable accessory as defined according to the first subject of the invention, characterized in that it comprises at least the following steps:

1) the preparation of a composite composition according to at least the following steps:
    i) the preparation of an aluminosilicate geopolymer composition comprising an alkali metal aluminate or an aluminosilicate, an alkali metal silicate, water and optionally an alkali metal base, in order to form an aluminosilicate geopolymer, said aluminosilicate geopolymer composition and the aluminosilicate geopolymer being as defined in the first subject of the invention, and
    ii) the mixing of an organic polymer or oligomer that is liquid at ambient temperature as defined in the first subject of the invention, with the aluminosilicate geopolymer from step i), and
    iii) optionally the addition of a crosslinking agent to the mixture from step ii); and
2) the application of the composite composition from step 1):
    either around one or more elongated conductive elements and/or around an inner layer of a power and/or telecommunications cable when the device is a cable,
    or around at least one of the inner layers of a joint or a termination when the device is a cable accessory,
    in order to form a composite layer as defined in the invention.

The process according to the invention is quick, simple and advantageous from an economic perspective. It makes it possible to manufacture, in relatively few steps, a device having excellent fire resistance, while guaranteeing good mechanical properties, especially in terms of flexibility.

The alkali metal silicate, the alkali metal aluminate and the aluminosilicate are as defined in the first subject of the invention.

When step iii) exists, a crosslinking agent as defined in the invention is used.

An inert filler and/or a colorant and/or a starch and/or a plasticizer and/or a cellulose compound as are defined in the invention may be added to the aluminosilicate geopolymer composition during step i), to the aluminosilicate geopolymer during step ii) or to the composite composition after step ii) and before step iii) if it exists.

The preparation of an aluminosilicate geopolymer composition according to step i) is generally carried out at a high pH, in particular varying from 10 to 13.

When an alkali metal aluminate is used, step i) preferably comprises the following substeps:
    i-a) the preparation of an aqueous alkali metal silicate solution with an $SiO_2/M'_2O$ molar ratio ranging from 1.6 to 35 approximately, and preferably from 1.6 to 4 approximately, M' being an alkali metal, the weight concentration of the alkali metal silicate in water ranging from 30% to 60% approximately, and preferably from 40% to 60% approximately, and i-b) the preparation of an aqueous alkali metal aluminate solution, the weight concentration of the alkali metal aluminate in water possibly ranging from 1.2% to 20% approximately, and i-c) the mixing of the aqueous solutions from substeps i-a) and i-b).

When an aluminosilicate is used, step i) preferably comprises the following substeps:

i-a') the preparation of an aqueous alkali metal silicate solution with an $SiO_2/M'_2O$ molar ratio ranging from 1.6 to 35 approximately, and preferably from 1.6 to 4 approximately, M' being an alkali metal, the weight concentration of the alkali metal silicate in water ranging from 30% to 60% approximately, and preferably from 40% to 60% approximately, and i-b') the mixing of an aluminosilicate in powder form having an $Al_2O_3/SiO_2$ molar ratio ranging from 0.4 to 0.8 approximately with the aqueous alkali metal silicate solution prepared in the previous step, the weight concentration of the aluminosilicate in the aqueous alkali metal silicate solution prepared in the previous substep possibly ranging from 10% to 80% approximately, and preferably from 25% to 65% approximately.

The combination of the aqueous alkali metal silicate solution and of the alkali metal aluminate solution or of the aqueous solution of alkali metal silicate and of aluminosilicate enables the formation of a gel of low to high viscosity depending on the respective contents of alkali metal aluminate or aluminosilicate, water and alkali metal silicate.

In particular, the aluminosilicate geopolymer composition at the end of substep i-c) or i-b') forms an aluminosilicate geopolymer in the form of a gel.

When an alkali metal aluminate is used, step 1) of preparing the composite composition may comprise (instead of steps i), ii) and iii)), the following steps:

a) the preparation of a first composition comprising an alkali metal aluminate as defined in the invention and optionally a crosslinking agent as defined in the invention, b) the preparation of a second composition comprising a polymer or oligomer that is liquid at ambient temperature as defined in the invention and a solution of alkali metal silicate as defined in the invention, and c) the mixing of the two compositions from the preceding steps.

An inert filler and/or a colorant and/or a starch and/or a plasticizer and/or a cellulose compound as are defined in the invention may be added to the first composition from step a) or the second composition from step b), or to the mixture from step c).

The aqueous alkali metal silicate solution from substep i-a) or i-a') or from step b) may be prepared by mixing silicon dioxide $SiO_2$ or an alkali metal silicate with a base M'OH in which M' is preferably K, Na or a mixture thereof.

The silicon dioxide $SiO_2$ can be selected from pyrogenic silica (also known as fumed silica), quartz and mixtures thereof.

In particular, the alkali metal base M'OH can be dissolved in water leading to a release of heat (exothermic reaction), then the silicon dioxide $SiO_2$ or the alkali metal silicate can be added.

The alkali metal silicate is preferably a sodium silicate.

The aqueous alkali metal aluminate solution from substep i-b) or step a) may be prepared by mixing an alkali metal aluminate in powder form and water.

Depending on the envisaged application, step 2) may be carried out by extrusion of said composite composition at ambient temperature or at high temperature, in particular at a temperature ranging from 60° C. to 110° C. approximately, and preferably from 70° C. to 95° C. approximately.

The process may further comprise a step 3) of crosslinking the organic polymer or oligomer that is liquid at ambient temperature, when the composite composition from step 1) comprises a crosslinking agent.

This step 3) may be carried out by any means known to person skilled in the art.

According to one particular embodiment of the invention, and when the device is a power and/or transmission cable, the process may further comprise, before, during or after step 2), a step 4) of applying an outer protective, in particular electrically insulating, sheath around the composite layer.

The creation of this outer protective sheath may in particular be carried out by extrusion.

Step 4) is generally carried out at ambient temperature since the geopolymerization is carried out at ambient temperature.

BRIEF DESCRIPTION OF THE DRAWINGS

The invention will be better understood, and other aims, details, features and advantages thereof will become more clearly apparent, during the course of the following description of particular embodiments of the invention which are given solely by way of nonlimiting illustration with reference to the appended figures.

In these figures.

DETAILED DESCRIPTION

For reasons of clarity, only the elements essential for the understanding of the invention have been represented schematically in these figures, this not being done to scale.

Figure 1:
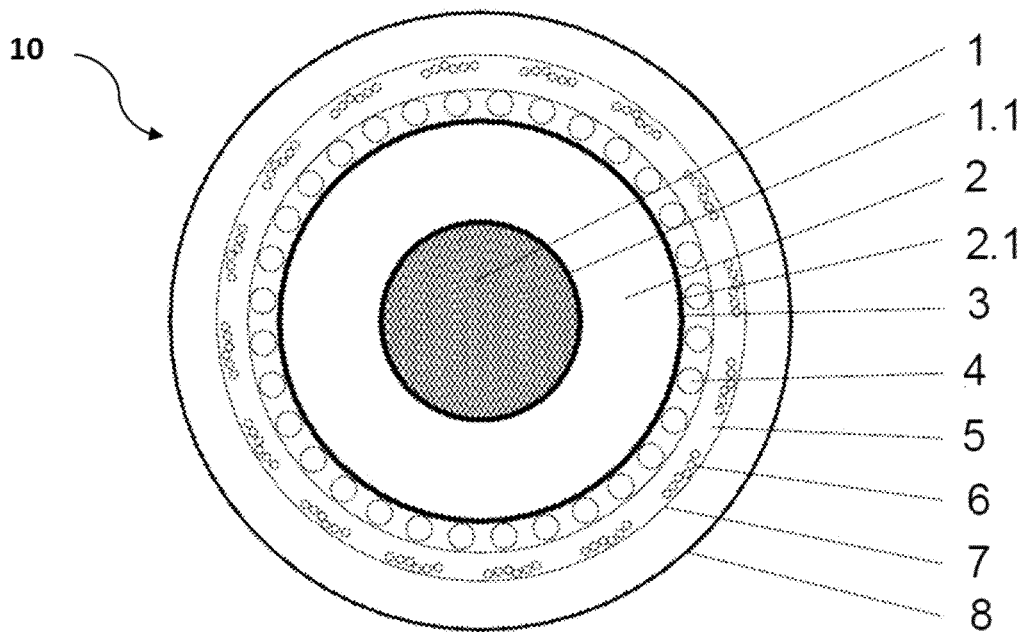
FIG. 1 is a schematic cross-sectional view of an electric cable from the prior art, not in accordance with the invention.

The electric cable 10, illustrated in FIG. 1, corresponds to a fire-resistant medium-voltage electric cable of SHXCHX type, for marine-type applications.

This electric cable 10 comprises: an elongated central electrically conductive element 1 and, successively and coaxially around this central conductive element 1, an inner semiconducting shield 1.1, an electrically insulating layer 2 (e.g. made of crosslinked ethylene-propylene elastomer, EPR), an outer semiconducting shield 2.1, a semiconducting tape layer 3, a metal braid 4 (e.g. consisting of tin-plated copper wires of circular cross section), an inner sheath comprising a polyester tape 5 and tin-plated copper wires 6, a polyester tape 7 and an outer sheath 8 (e.g. made of elastomer).

Figure 2:
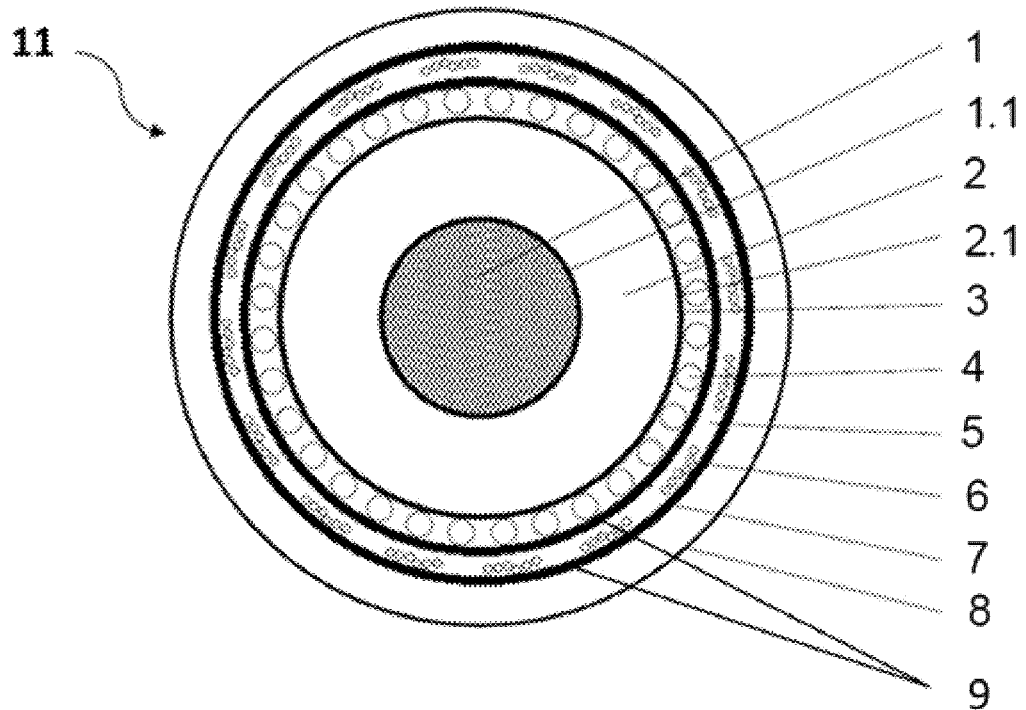
FIG. 2 is a schematic cross-sectional view of an electric cable according to one embodiment of the present invention.

The electric cable 11 illustrated in FIG. 2 corresponds to an electric cable having a similar structure to the cable of FIG. 1, but into which two composite layers as defined in the invention have been incorporated.

This electric cable 11 comprises: an elongated central electrically conductive element 1 and, successively and coaxially around this central conductive element 1, an inner semiconducting shield 1.1, an electrically insulating layer 2

(e.g. made of crosslinked ethylene-propylene elastomer, EPR), an outer semiconducting shield 2.1, a semiconducting tape layer 3, a metal braid 4 (e.g. consisting of tin-plated copper wires of circular cross section), a composite layer 9 as defined in the invention, an inner sheath comprising a polyester tape 5 and tin-plated copper wires 6, a polyester tape 7, a composite layer 9 as defined in the invention, and an outer sheath 8 (e.g. made of elastomer).

The following examples make it possible to illustrate the present invention. They do not have any limiting effect on the overall scope of the invention as presented in the claims. The ratios between the oxides are molar ratios, and the percentages indicated are percentages by weight.

EXAMPLES

The raw materials used in the examples are listed below:
aqueous sodium silicate solution at approximately 50% by weight, of waterglass type from Simalco, of formula $Na_2O.2SiO_2$ and with an $SiO_2/Na_2O$ molar ratio of approximately 2,
sodium aluminate, Sigma-Alrich,
tap water,
sodium hydroxide, Sigma Aldrich, of purity >85%.
Unless otherwise indicated, all these raw materials were used as received from the manufacturers.

Example 1: Preparation of a Fire-Resistant Device in Accordance with the Invention An aluminosilicate geopolymer composition was prepared in the following way: an alkali metal silicate solution was prepared by dissolving mixing 900 g of sodium aluminate in 9 kg of $H_2O$. 9 kg of an aqueous sodium silicate solution are added to this solution.

Said aluminosilicate geopolymer composition comprised 28.6% by weight approximately of solids relative to the total weight of said composition.

After the mixing, the geopolymerization took place and an aluminosilicate geopolymer in the form of a gel was obtained. The aluminosilicate geopolymer was then mixed with 5 kg of liquid EVA in order to form a composite composition.

300 g of talc were then added to the resulting composition.

The composite composition was extruded at high temperature around an elongated electrically conductive element made of copper with a cross section 20 mm² using an extruder sold under the trade name FAIREX. The temperature within the extruder ranged from 60° C. to 135° C. approximately.

The composite layer had a thickness of 2.5 mm approximately.

The invention claimed is:

1. A device having a power and/or telecommunications cable and/or a power and/or telecommunications cable accessory, wherein said cable and/or said cable accessory comprises:
   at least one composite layer obtained from a composite composition comprising at least one organic polymer or oligomer that is liquid at ambient temperatures; and
   at least one aluminosilicate geopolymer in the form of a gel, said aluminosilicate geopolymer in the form of a gel being obtained from an aluminosilicate geopolymer composition comprising an alkali metal aluminate or an aluminosilicate, an alkali metal silicate, water and optionally an alkali metal base.

2. The device as claimed in claim 1, wherein the alkali metal silicate is selected from sodium silicates, potassium silicates and a mixture thereof.

3. The device as claimed in claim 1, wherein the alkali metal aluminate is a sodium aluminate.

4. The device as claimed in claim 1, wherein the alkali metal base is selected from KOH, NaOH and mixtures thereof.

5. The device as claimed in claim 1, wherein the aluminosilicate geopolymer composition comprises from 0.5% to 20% by weight of an alkali metal aluminate, from 15% to 50% by weight of an alkali metal silicate, from 0 to 3% by weight of an alkali metal base and from 50% to 90% by weight of water.

6. The device as claimed in claim 1, wherein the aluminosilicate geopolymer composition comprises from 15% to 50% by weight of solids, relative to the total weight of said composition.

7. The device as claimed in claim 1, wherein the organic oligomer or polymer that is liquid at ambient temperature is selected from polyorganosiloxanes, polyethylenes, ethylene/vinyl acetate copolymers, polyethylene glycols, epoxide resins and acrylic resins.

8. The device as claimed in claim 1, wherein the organic oligomer or polymer that is liquid at ambient temperature is a silicone oil having a viscosity ranging from 5000 to 50 000 cP at 25° C.

9. The device as claimed in claim 1, wherein the organic polymer or oligomer that is liquid at ambient temperature represents from 15% to 50% by weight, relative to the total weight of the composite composition.

10. The device as claimed in claim 1, wherein the composite composition further comprises a crosslinking agent.

11. The device as claimed in claim 10, wherein the crosslinking agent represents from 0.2% to 5% by weight, relative to the total weight of the composite composition.

12. The device as claimed in claim 1, wherein the composite layer has a thickness ranging from 0.5 to 4 mm.

13. The device as claimed in claim 1, wherein the composite layer is an inner layer of said cable or of said cable accessory.

14. The device as claimed in claim 1, wherein the aluminosilicate geopolymer represents from 20% to 90% by weight, relative to the total weight of the composite composition.

15. The device as claimed in claim 1, wherein the organic polymer or oligomer preferably represents from 15% to 80% by weight, relative to the total weight of the composite composition.

16. A process for preparing a device comprising a power and/or telecommunications cable and/or a power and/or telecommunications cable accessory, as defined in claim 1, said method comprising at least the following steps:
   1) the preparation of said composite composition according to at least the following steps:
      i) the preparation of said aluminosilicate geopolymer composition comprising an alkali metal aluminate or an aluminosilicate, an alkali metal silicate, water and optionally an alkali metal base, in order to form an aluminosilicate geopolymer in the form of a gel, and
      ii) the mixing of said organic polymer or oligomer that is liquid at ambient temperature, with the aluminosilicate geopolymer from step i), and
      iii) optionally the addition of a crosslinking agent to the mixture from step ii); and
   2) the application of the composite composition from step 1):

either around one or more elongated conductive elements and/or around an inner layer of a power and/or telecommunications cable when the device is a cable, or around at least one of the inner layers of a joint or a termination when the device is a cable accessory, in order to form said composite layer.

17. The process as claimed in claim 16, wherein step i) comprises the following substeps:
   i-a) the preparation of an aqueous alkali metal silicate solution with an $SiO_2/M'_2O$ molar ratio ranging from 1.6 to 35, M' being an alkali metal, the weight concentration of the alkali metal silicate in water ranging from 30% to 60%, and
   i-b) the preparation of an aqueous solution of alkali metal aluminate, the weight concentration of the alkali metal aluminate in water ranging from 1.2% to 20%, and
   i-c) the mixing of the aqueous solutions from substeps i-a) and i-b).

18. The process as claimed in claim 16, wherein step 2) is carried out by high-temperature or ambient-temperature extrusion of said composite composition.

19. The process as claimed in claim 16, wherein said process further comprises a step 3) of crosslinking the organic polymer or oligomer that is liquid at ambient temperature, when the composite composition from step 1) comprises a crosslinking agent.

\* \* \* \* \*